(12) United States Patent
Silva

(10) Patent No.: US 9,572,325 B2
(45) Date of Patent: Feb. 21, 2017

(54) STOP PULLING HARNESS

(76) Inventor: Theresa G. Silva, Star, ID (US)

( * ) Notice: Subject to any disclaimer, the term of this patent is extended or adjusted under 35 U.S.C. 154(b) by 853 days.

(21) Appl. No.: 13/076,256

(22) Filed: Mar. 30, 2011

(65) Prior Publication Data

US 2011/0283956 A1    Nov. 24, 2011

Related U.S. Application Data

(60) Provisional application No. 61/396,241, filed on May 24, 2010.

(51) Int. Cl.
*A01K 27/00* (2006.01)

(52) U.S. Cl.
CPC ........... *A01K 27/002* (2013.01); *A01K 27/003* (2013.01)

(58) Field of Classification Search
CPC ..... A01K 27/00; A01K 27/002; A01K 27/003
USPC ........ 119/792, 793, 797, 798, 856, 863, 864
IPC ....................................................... A01K 27/00
See application file for complete search history.

(56) References Cited

U.S. PATENT DOCUMENTS

| | | | | |
|---|---|---|---|---|
| 3,311,088 A * | 3/1967 | Peterlin | | 119/793 |
| 4,763,609 A * | 8/1988 | Kulik | | 119/797 |
| 4,879,972 A * | 11/1989 | Crowe et al. | | 119/792 |
| 4,924,815 A * | 5/1990 | Halla | | 119/864 |
| 5,647,303 A * | 7/1997 | Deioma | | 119/864 |
| 5,660,146 A * | 8/1997 | Sporn | | 119/792 |
| 5,706,764 A * | 1/1998 | Irbinskas | | 119/792 |
| 5,791,295 A * | 8/1998 | Schmid et al. | | 119/793 |
| 5,950,570 A * | 9/1999 | Dickerson | | 119/792 |
| 6,626,132 B1* | 9/2003 | Mann | | 119/795 |
| 7,284,504 B1* | 10/2007 | Purschwitz et al. | | 119/792 |
| 2006/0102104 A1* | 5/2006 | Young, III | | 119/798 |
| 2010/0050956 A1* | 3/2010 | Pellei | | 119/770 |

* cited by examiner

*Primary Examiner* — Thien Thanh Pham
(74) *Attorney, Agent, or Firm* — Parsons Behle & Latimer

(57) ABSTRACT

The present disclosure is for an adjustable leash that can quickly and easily be converted to a restraining harness that helps to inhibit the unwanted movement of the dog or other animal walking on the leash. In some embodiments, the leash is adjustable without the use of any tools and can be adapted to fit quadrupeds of a variety of sizes.

11 Claims, 2 Drawing Sheets

STOP PULLING HARNESS

CROSS REFERENCE TO RELATED APPLICATIONS

This application claims priority under 35 USC §119 to U.S. Provisional Patent Ser. No. 61/396,241, filed on May 24, 2010, and titled "STOP PULLING HARNESS," the entire contents of which are hereby incorporated by reference.

BACKGROUND

Technical Field

The present disclosure relates to restraint devices for quadruped animals. More particularly, the present disclosure relates to an adjustable leash that is easily adapted to restraining a quadruped, such as a dog, from excessively pulling or straining when walked on a leash.

Background

Various drawbacks exist for many types of existing harnesses and leashes for animals such as dogs or other quadrupeds. For example, leashes that attach solely to a collar, or other types of neck or head worn harnesses, if improperly used can cause injury and harm to the animal wearing the leash. Another drawback of existing body-worn harnesses is that they are relatively expensive and difficult to put on.

Another drawback of existing leashes and harnesses is that some quadrupeds, dogs in particular, are prone to try and lunge, run, tug, or strain against the leash. This is a more acute drawback when the dog is of a large, powerful breed and the person holding the leash is relatively small or overmatched compared to the dog. In this scenario, the dog ends up dragging or pulling the person along behind which is not a desirable or enjoyable result for the person, and is detrimental to the discipline and training of the dog. Other drawbacks also exist.

Therefore, it is desirable to provide a relatively inexpensive and easy to use leash or harness that it easy to use and obviates many of the known drawbacks of existing products. It is further desirable, to provide a leash or harness that helps to inhibit a dog, or other animal, from lunging or straining against the leash.

SUMMARY

The present disclosure advantageously addresses one or more of the aforementioned deficiencies by providing an adjustable leash that can quickly and easily be converted to a restraining harness that helps to inhibit the unwanted movement of the dog or other animal walking on the leash. In some embodiments, the leash is adjustable without the use of any tools and can be adapted to fit quadrupeds of a variety of sizes.

In one embodiment, the adjustable leash can be attached to a collar or other harness and function as a normal leash or lead when walking a dog or other quadruped. In the event the dog or other quadruped displays undesirable behavior (e.g., lunging, or tugging against the leash) the free end of the leash can be passed through a loop forming junction (e.g., a ring or other connector) to form a loop in the leash that encircles the dog's or other quadruped's body in a region near the hind legs. Further undesirable behavior by the dog or quadruped will result in tightening or cinching of the loop around the body, and in turn causing mild discomfort to the animal that discourages the undesirable behavior.

In another embodiment, the leash is adjustable so that the loop forming junction (e.g., ring) may be positioned in a desirable location on the dog's or other quadruped's body. In some embodiments, a desirable location on the dog is adjacent to the hind legs of the animal. On male dogs or quadrupeds, the location of the loop forming junction may be adjusted to not interfere with, or cause pain in, the animal's reproductive organs. In some embodiments, the portions of the leash that encircle or contact the animal's body may be padded for additional comfort or protection against injury, while still delivering the tightening or cinching to curb the undesirable behavior.

In another embodiment the leash is adjustable to fit differing sizes of dogs or other quadruped. In this fashion, a person owning more than one dog of differing sizes or breeds can adjust the leash to fit any number of animals.

The present disclosure will now be described more fully with reference to the accompanying drawings, which are intended to be read in conjunction with both this summary, the detailed description, and any preferred or particular embodiments specifically discussed or otherwise disclosed. This disclosure may, however, be embodied in many different forms and should not be construed as limited to the embodiments set forth herein; rather, these embodiments are provided by way of illustration only so that this disclosure will be thorough, and fully convey the full scope of the invention to those skilled in the art.

DETAILED DESCRIPTION

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention, and it is to be understood that modifications to the various disclosed embodiments may be made, and other embodiments may be utilized, without departing from the spirit and scope of the present invention. The following detailed description is, therefore, not to be taken in a limiting sense.

Figure 1:
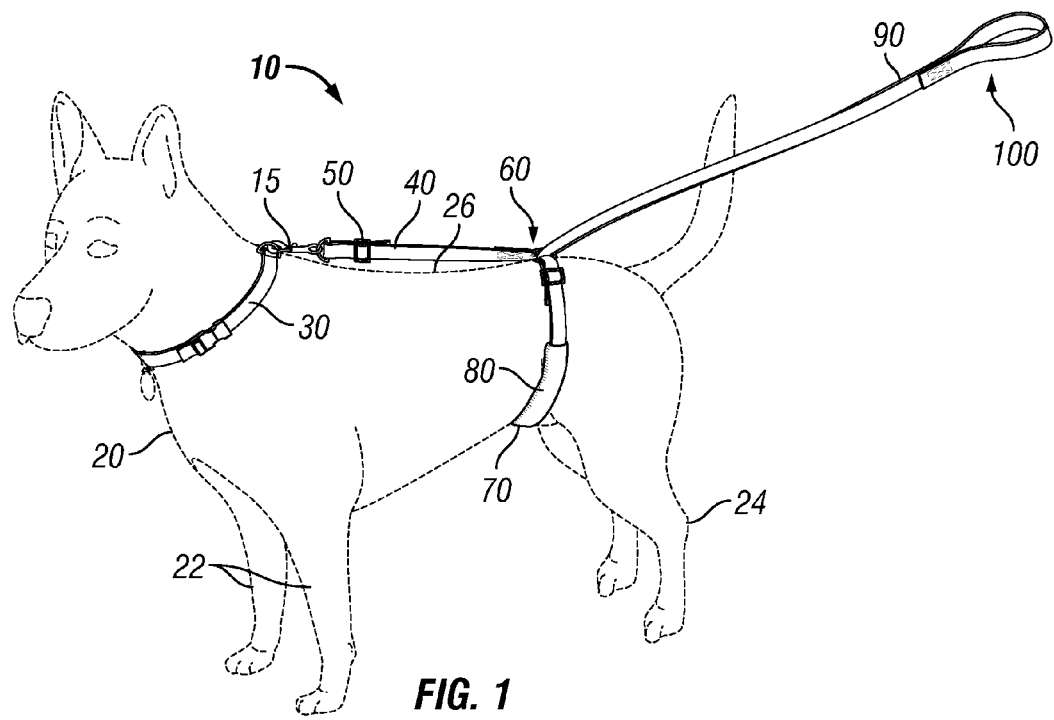
FIG. 1 is an exemplary depiction of an embodiment of the invention in use as a restraint on a dog or other quadruped.

With reference to FIG. 1, the adjustable leash is shown generally at 10. As shown, the adjustable leash 10 has an end 15 that is releasably attachable to a collar or other harness 30 that is worn by a dog or other quadruped animal 20. In some embodiments, end 15 may include a clasp, hook, latch, buckle, or other releasable fastener that can attach to an appropriate eyelet or ring on the collar or other harness 30. In other embodiments, it may be desirable to make the collar 30 integral with end 15, for example, by fashioning an adjustable loop or the like that would fit around the neck, shoulders, or forelegs 22, of the dog or animal 20.

Further, while dog or other quadruped 20 animal is generally depicted in FIG. 1 as a canine, the disclosure is not so limited. The adjustable leash 10 may be used with any animal for which control by leash or harness is appropriate, and further, the animal need not be a quadruped.

In some embodiments, adjustable leash 10 may be constructed out of cord or cord-like material. For example, adjustable leash 10 may be constructed out of flat or tubular webbing material, rope, cord, straps, woven material, linked or chain material, wire, cable, or other relatively flexible cord-like material. In some embodiments, the adjustable leash 10 may be constructed out of Nylon, plastics, rubbers, or other synthetic materials. In other embodiments, the adjustable leash 10 may be made out of natural materials such as leather, natural fibers, metals (including alloys), or the like.

As also shown in FIG. 1, end 15 is part of a first portion 40 of the adjustable leash 10. First portion 40 may be adjustable in length through use of an appropriate adjustment mechanism 50 such as a double or triple slide, D-rings, buckles, snaps, buttons, hook-and-loop fasteners, or other cord adjustment mechanisms. In some embodiments, adjustment mechanism 50 is employed to position loop forming junction 60 at or near the hind legs 24 of the dog or other quadruped 20, and generally along the spine or back 26 of the dog or other animal 20.

As further shown in FIG. 1, first portion 40 connects with a loop forming junction 60. In some embodiments, loop forming junction 60 may comprise a ring or other similar device that facilitates the formation of a loop in the adjustable leash 10.

As illustrated with reference to FIG. 2, when not configured as a restraining harness, adjustable leash 10 functions as a normal leash, in that it is attached to the dog or other quadruped 20 via a collar or other harness 30 and grasped at a free end 100 by the person walking the dog or other quadruped 20. Of course, free end 100 is at the end of a second portion 90 of the adjustable leash 10 and may have a loop, handle, or other mechanism to facilitate the grasping and control of the adjustable leash 10. When it is desired to configure the adjustable leash 10 into a restraining harness, the free end 100 of the second portion 90 is wrapped around the dog or other quadruped 20 at a region at or near the hind legs 24. The free end 100 is then passed through the loop forming junction 60 in order to snuggly fit around the dog or other quadruped 20 as shown with reference to FIG. 1. Any undesirable behavior by the dog or other quadruped 20 (e.g., lunging, running, tugging, or straining against the adjustable leash 10) causes the loop portion 70 to tighten or cinch around the body of the dog or other quadruped 20 and discourages the undesirable behavior.

Figure 2:
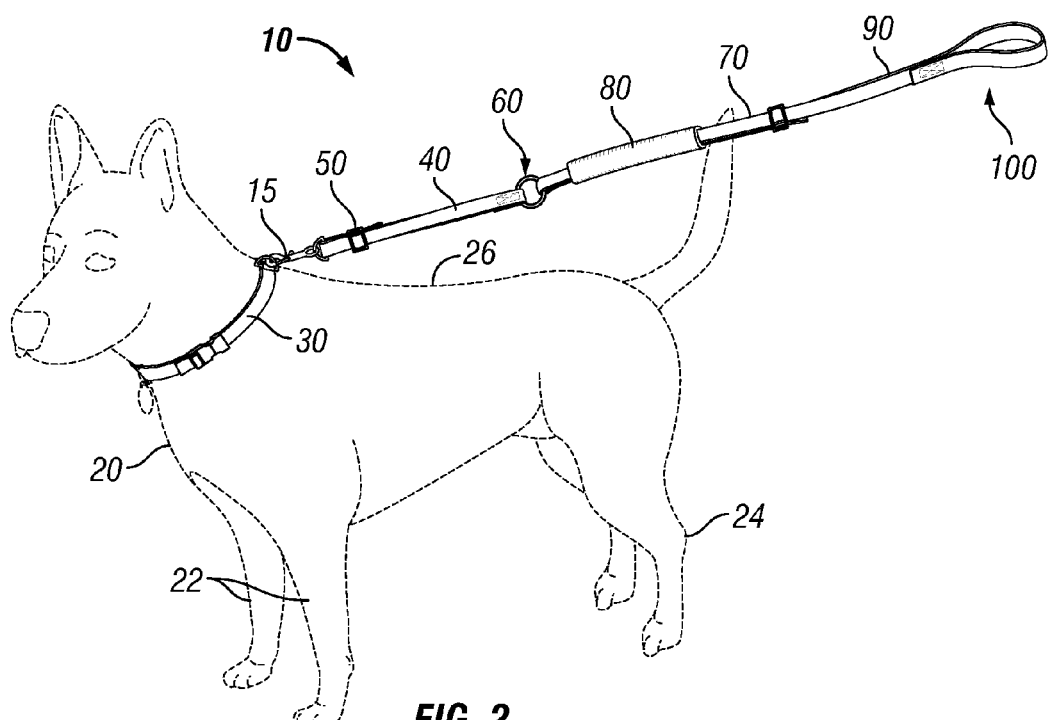
FIG. 2 is an exemplary depiction of an embodiment of the invention in use as a leash on a dog or other quadruped.

As depicted in FIGS. 1 and 2, the first portion 40 and second portion 90 of the adjustable leash 10 meet at loop forming junction 60. As described above, the loop forming junction 60 facilitates the forming of a loop, using loop portion 70, around the body of the dog or other quadruped 20. Loop forming junction 60 may be manufactured in any appropriate manner from a material suitable to handle the anticipated stresses and loading on the leash 10. For example, and with reference to FIGS. 3A-3C, loop forming junction 60 may comprise a metal ring 60a, a D-ring 60b, a triangular shaped ring 60c, or some other appropriately shaped junction point.

Figure 3A:
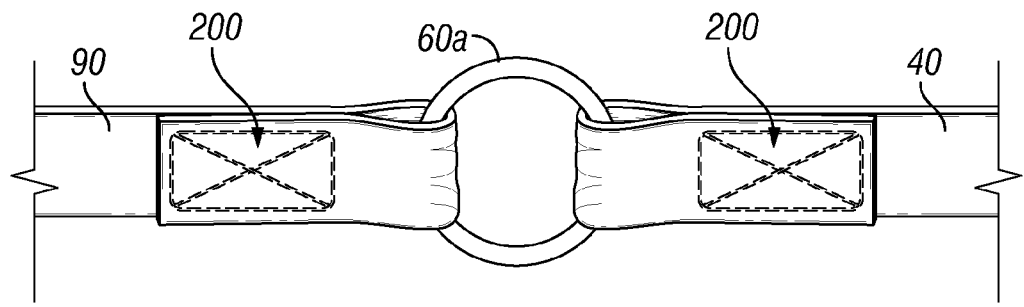
FIG. 3A is an exemplary depiction of ring embodiment of a loop forming junction according to some embodiments of the invention.
Figure 3B:
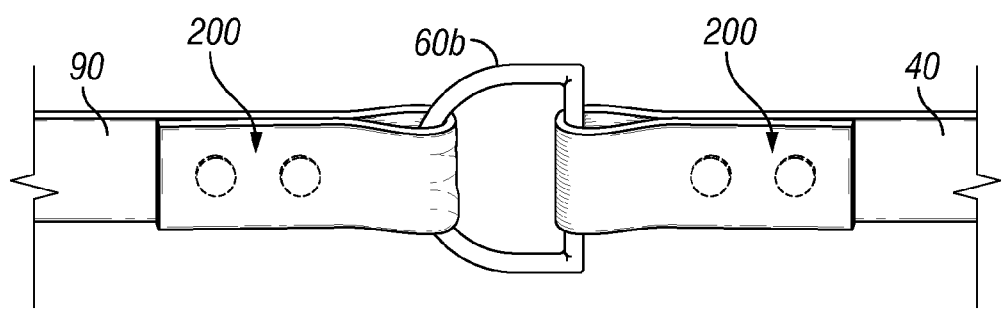
FIG. 3B is an exemplary depiction of a D-ring embodiment of a loop forming junction according to some embodiments of the invention.
Figure 3C:
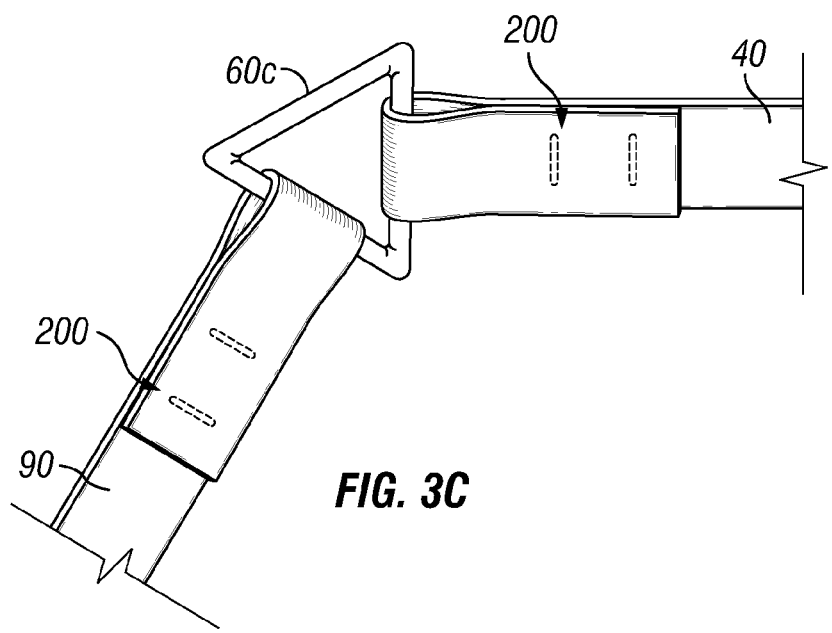
FIG. 3C is an exemplary depiction of an triangular ring embodiment of a loop forming junction according to some embodiments of the invention.

As also illustrated in FIGS. 3A-3C, the loop forming junction 60 may be securely fastened to the first portion 40 of the leash 10, as well as fixed end of the second portion 90 of the leash 10, by any appropriate method as indicated at 200. For example, the material of first portion 40 may be folded and sewed, glued, melted, welded, or otherwise fastened using mechanical fasteners (e.g., staples, crimps, or the like). The method of fastening may vary according to factors such as the materials used or the strength desired.

As described herein, one function of the loop forming junction 60 is to enable the forming of a loop using loop portion 70 of the leash 10. Thus, it is possible to implement any combination of shapes, materials, and coatings, or the like, that facilitate the feeding through of free end 100 and the motion of second portion 90 as it tightens or cinches upon tension. For example, for a leash 10 made of round profile cord-like material (e.g., rope), a circular ring (such as 60a) made of steel or the like may perform best for forming a cinchable loop, whereas with flat profile cord-like material (e.g., Nylon webbing) a triangular shaped ring (such as 60c) may perform best. In addition, knurled surfaces, silicone or Teflon coatings, or vinyl or similar covers may be implemented in loop forming junction 60 to facilitate the operation of the loop portion 70. Thus, for example, if the cord-like material slides too easily through the loop forming junction 60, knurling or coatings may be added to increase friction. Conversely, if the material does not slide easily, coatings or vinyl covers may be added to decrease friction. Other solutions, such as mechanical features (e.g., a locking gate, or the like, built into the junction 60) are also possible.

Likewise, the material used to make loop forming junction 60 can vary depending upon the nature of the intended use. In some embodiments, steel or other metal junction rings 60 are desirable (e.g., when large forces are expected). In other embodiments, plastic, or other synthetic materials may be implemented (e.g., when lower manufacturing costs are desirable, or for use in wet environments where metals may rust).

In some embodiments it may be advantageous to pad or otherwise soften the loop portion 70 where it contacts the dog or other quadruped 20. This may be accomplished in any suitable fashion, for example, by including a positionable pad 80, or by constructing the loop portion 70 of the leash 10 out of softer, more elastic, or otherwise padded material 80. One object of padding portion 80 of the leash 10 is to minimize or prevent injury to the dog or other quadruped. Other padding configurations are also possible.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. An adjustable dog leash comprising:
    an adjustment portion connected to a loop forming junction;
    an adjustment mechanism positioned on the adjustment portion, whereby the adjustment portion is adjustable in length in order to position the loop forming junction at a dog's hind legs;
    a looping portion connected at one end to the loop forming junction, and having a free end; and
    wherein the free end is configured to be passable through the loop forming junction to create a loop in the dog leash that passes substantially around the body at the hind legs of the dog upon which the leash is applied.

2. The adjustable dog leash of claim 1 wherein the loop forming junction is a ring.

3. The adjustable dog leash of claim 1 wherein the looping portion further comprises a padded portion.

4. A restraint for a quadruped animal, the restraint comprising:
- a first portion of cord material that is adjustable in length and comprises an adjustment mechanism;
- a second portion of cord material that has a fixed end and a free end;
- a junction attached to one end of the first portion of cord material and to the fixed end of the second portion of cord material; and
- wherein the free end of the second portion of cord material is configured to be looped around a portion of a quadruped animal and passed through the junction to form an adjustable size loop around the portion of the quadruped animal at the quadruped's hind legs.

5. The restraint of claim 4 wherein the cord material is webbing.

6. The restraint of claim 4 further comprising an adjustable closure to enable the adjustment of the length of the first portion of cord material.

7. The restraint of claim 6 wherein the adjustable closure is a triple-slide adjuster.

8. The restraint of claim 4 wherein the junction further comprises a ring.

9. The restraint of claim 8 wherein the ring is a D-shaped ring.

10. The restraint of claim 4 wherein the junction further comprises a triangular ring.

11. The restraint of claim 4 wherein at least a portion of the adjustable size loop is padded.

* * * * *